United States Patent [19]

Franz

[11] 4,205,974

[45] Jun. 3, 1980

[54] GLASS WELDING USING AQUEOUS COLLOIDAL GRAPHITE WITH IMPROVED WETTING PROPERTIES

[75] Inventor: Helmut Franz, Pittsburgh, Pa.

[73] Assignee: PPG Industries, Inc., Pittsburgh, Pa.

[21] Appl. No.: 37,592

[22] Filed: May 9, 1979

[51] Int. Cl.² .................... C03C 27/00; C03B 39/00
[52] U.S. Cl. ............................ 65/40; 65/58; 65/DIG. 4; 252/22; 252/29
[58] Field of Search ............ 65/40, 58, DIG. 4; 252/22, 29

[56] References Cited

U.S. PATENT DOCUMENTS

| | | | |
|---|---|---|---|
| 2,389,360 | 11/1945 | Guyer et al. ............................ | 65/40 |
| 2,560,051 | 7/1951 | Brown ................................... | 252/22 |
| 2,597,106 | 5/1952 | Kallenborn ........................... | 427/286 |
| 2,673,838 | 3/1954 | Veatch et al. ......................... | 252/29 |
| 2,719,386 | 10/1955 | Johnson et al. ....................... | 65/40 |
| 2,932,576 | 4/1960 | Vierk et al. ........................... | 252/29 X |
| 3,011,975 | 12/1961 | Nitzsche et al. ...................... | 252/29 X |
| 3,495,962 | 2/1970 | Norton et al. ........................ | 252/22 X |
| 3,518,192 | 6/1970 | Cairns et al. .......................... | 252/29 |
| 4,052,323 | 10/1977 | Feneberger et al. .................. | 252/22 X |

FOREIGN PATENT DOCUMENTS 817003   7/1959   United Kingdom ..................... 252/22

*Primary Examiner*—Arthur D. Kellogg
*Attorney, Agent, or Firm*—Donna L. Seidel

[57] ABSTRACT

Double-glazed window units made by electrically heating the margins of two glass sheets to form a continuous peripheral weld are disclosed wherein an electroconductive stripe is deposited on the margins of one of the glass sheets from an aqueous composition comprising colloidal graphite, a perfluoroalkyl surfactant and optionally a water-soluble thixotropic agent.

6 Claims, No Drawings

GLASS WELDING USING AQUEOUS COLLOIDAL GRAPHITE WITH IMPROVED WETTING PROPERTIES

FIELD OF THE INVENTION

The invention relates generally to the art of glass welding and more particularly, to the art of welding glass which comprises a metal or metal oxide at or near the surface.

THE PRIOR ART

It is well-known to manufacture double-glazed window units by separating two sheets of glass to create an insulating space while the heat softened marginal portions of the glass sheets are fused to form a continuous peripheral weld. Such a method of glass welding is described in U.S. Pat. No. 2,389,360 to Guyer et al.

In the process of manufacturing such an all glass double-glazed unit, two glass sheets are washed, dried, preheated and assembled one above the other. The marginal portions of the glass sheets are then heated to softening so that the edges of the glass sheets are fused as the sheets are separated to create an insulating space. A preferred method for heating the margins of the glass sheets is by passing an electric current through an electroconductive material deposited along the periphery of at least one of the glass sheets. A preferred electroconductive material is colloidal graphite, a solution of which may be brushed, sprayed or applied by any conventional means to the glass margins.

Although common aqueous compositions of colloidal graphite are suitable for forming electroconductive stripes on sheet or plate glass, when float glass is used in glass welding processes some wetting problems are encountered. The stripe may narrow or even bead up causing the heating of the marginal portion of the glass to be nonuniform resulting in inferior welds and corner crazing of the double-glazed unit. The wetting problem is much more serious if the glass to be welded is coated with a metal or metal oxide coating such as are available on solar energy reflective architectural glass.

SUMMARY OF THE INVENTION

According to the present invention an improved, properly wetting aqueous colloidal graphite composition is obtained by adding a slightly carboxylated perfluoroalkyl surfactant to an aqueous colloidal graphite composition. A further improvement may be obtained by adding a water soluble thixotropic agent, such as a high molecular weight polysaccharide, to the composition to prevent running of the electroconductive stripe on the glass or dripping of the composition from the application apparatus.

DESCRIPTION OF THE PREFERRED EMBODIMENT

Glass sheets are prepared for welding by conventional cleaning techniques. The glass sheets may be of any typical glass composition, are preferably float glass, and may be coated with a solar energy reflective film. Coated glass sheets are preferably prepared by rinsing with an isopropanol/water solution.

In a typical glass welding process, the heating of the marginal portions of a glass sheet is effected by localized electrical conductance along a peripheral stripe of electroconductive material, preferably an aqueous composition of colloidal graphite. The electroconductive stripe may be applied by any conventional technique such as brushing or spraying, but is preferably applied by rolling from a transfer wheel.

Preferred aqueous colloidal graphite compositions are prepared by diluting with water concentrated graphite suspensions such as Electrodag 137, available commercially from Acheson Colloids Company. The aqueous colloidal graphite compositions according to the present invention preferably further comprise a nonfoaming slightly carboxylated perfluoroalkyl surfactant to achieve proper wetting of a metal containing glass surface or a glass surface coated with a metal containing film. The degree of carboxylation is characterized, for the purposes of the present invention, by infrared analysis of the ratio of COOH to $CF_2$ groups. Slight carboxylation is defined, according to the present invention as $$\log I \frac{COOH}{CF_2} \leq 0.2$$

wherein I is the intensity of the infrared absorption band. Preferred surfactant compositions include perfluoroalkyl ethoxylates and perfluoroalkyl ammonium compounds. Two particularly useful compositions are commercially available from Dupont Company of Wilmington, Del. as Zonyl FSJ and Zonyl FSN surfactants. Enough surfactant is added to achieve sufficient wetting so that a uniform stripe is formed. Typically, surfactant concentrations of about 0.001 to 5 percent are useful while concentrations of about 0.01 to 1.0 percent are preferred.

In a particularly preferred embodiment, the aqueous colloidal graphite composition containing a nonfoaming slightly carboxylated perfluoroalkyl surfactant further comprises a water soluble thixotropic agent. The thixotropic agent thickens the striping composition so that it does not run on the glass surface or drip from the striping apparatus, but does not interfere with the wetting properties achieved by the surfactant. Preferred thixotropic agents, in addition to being compatible with the colloidal graphite and surfactant in the aqueous medium, should be capable of completely burning off so as to leave no residue on the glass surface. Carbohydrates are useful in this regard. A preferred thixotropic agent is a high molecular weight polysaccharide such as Kelzan, available from Kelco Company of New Jersey. Being a carbohydrate, the thixotrope leaves no residue on the glass surface. The concentration of thixotrope may vary considerably. For the Kelzan xantham gum product, with a molecular weight greater than one million, concentrations in the range of 0.1 to 1 percent are most useful.

The aqueous colloidal graphite composition containing a nonfoaming, slightly carboxylated perfluoroalkyl surfactant is preferably applied to the periphery of a glass sheet in accordance with the teachings of U.S. Pat. No. 2,597,106; that is, with a resiliently supported roller moving in the opposite direction from a glass sheet being conveyed through the striping apparatus.

After a uniform electroconductive stripe has been applied to the periphery of the glass sheet, a second glass sheet is assembled with the first, generally in such a manner that the electroconductive stripe is on the upper surface of the upper glass sheet. Preferably the glass sheets are preheated. Electrodes are provided, preferably at the corners of a rectangular window assembly, to direct an electric current through the electroconductive stripe causing the stripe to be heated. The adjacent portions of glass are likewise heated by the electric current flowing through the stripe.

As electrical heating continues, the marginal portions of glass reach a temperature at which the stripe of electroconductive material burns off. At such sufficiently high temperatures, however, the glass itself becomes electrically conductive so that the electrical heating current continues to flow through the marginal portions of the glass, ultimately heating the glass periphery to its softening point whereupon the edges of the two glass sheets are fused to form a continuous weld about the periphery of the assembled sheets, which are then separated to form an insulating space. A preferred method for heating the marginal portions of a glass sheet to fusing temperature to form a multiple-glazed unit is disclosed in U.S. Pat. No. 3,847,584, which disclosure is incorporated herein by reference.

The present invention will be further understood from the descriptions of specific examples which follow.

EXAMPLE I

A composition for the deposition of an electroconductive stripe on a glass sheet to facilitate glass welding to form a double-glazed unit is prepared by adding one percent of a slightly carboxylated perfluoroalkyl surfactant to a typical aqueous colloidal graphite composition. In this example, 1 drop of a nonionic perfluoroalkyl ethoxylate, Zonyl FSN surfactant from Dupont, is added per milliliter of a solution comprising 40 milliliters of Electrodag 137 colloidal graphite from Acheson and 300 milliliters of water.

The composition is applied about the periphery of a float glass sheet. A continuous uniform stripe is formed. Proper wetting is evidenced by the fact that no narrowing or beading of the stripe is observed. The glass sheet is then welded to a second glass sheet. A good weld is formed, more uniform and with less corner crazing than if no surfactant is employed in the composition.

EXAMPLE II

Glass coated with a reflective metal oxide film is prepared for welding by cleaning with isopropanol and water. A composition is prepared by adding 0.1 percent (solids) Zonyl FSN surfactant to an aqueous composition of Electrodag 137 colloidal graphite (22 percent solids) diluted with 9 volumes of water. The composition is nonfoaming and forms a continuous, properly wetting stripe on the glass sheet. Following the procedures outlined above, a uniform weld is formed.

EXAMPLE III

While the compositions of the previous examples from continuous uniform electroconductive stripes on both float glass surfaces and metal oxide coated glass surfaces, it is observed that the addition of the surfactant, even in low concentrations, may cause the colloidal graphite composition to thin somewhat. An improvement in applying the stripe is obtained by adding a thixotropic agent to the composition. In this example, 1.5 grams of Kelzan thixotropic powder, a xanthan gum product available from Kelco Company, is added to a composition containing an anionic perfluoroalkyl ammonium compound, 0.1 percent Zonyl FSJ concentrated surfactant, and 5.0 percent Electrodag 137 colloidal graphite in demineralized water. A continuous, uniformly wetting electroconductive stripe is formed. The thixotropic agent does not interfere with the wetting properties attributed to the surfactant and neither the thixotropic agent nor the surfactant interferes with the electrical conductivity properties of the colloidal graphite. A uniform weld is formed.

The above examples are offered to illustrate the present invention. Various modifications are included within the scope of the present invention which is defined by the following claims.

I claim:

1. In a method for welding glass sheets to form a multiple-glazed unit comprising the steps of assembling at least two sheets of glass, applying a composition to form an electroconductive stripe about the periphery of at least one of the glass sheets, applying an electric current through the stripe to heat the underlying glass, and fusing the edges of the glass sheets together to form a multiple-glazed unit, the improvement which comprises adding to such composition a slightly carboxylated, perfluoroalkyl surfactant to improve the wetting properties.

2. The improved method according to claim 1, wherein the surfactant is a nonionic perfluoroalkyl ethoxylate.

3. The improved method according to claim 1, wherein the surfactant is an anionic perfluoroalkyl ammonium compound.

4. The improved method according to claim 1, wherein the composition further comprises a thixotropic agent.

5. The improved method according to claim 4, wherein the thixotropic agent is a high molecular weight polysaccharide.

6. In a composition for applying an electroconductive stripe onto glass comprising an aqueous formulation of colloidal graphite, the improvement which comprises a slightly carboxylated perfluoroalkyl surfactant.

* * * * *